S. L. Wiegand's Safe Portable Boiler.
No. 119,257.
Patented Sep. 26, 1871.
Case. C.
[72.]
Fig. 1.
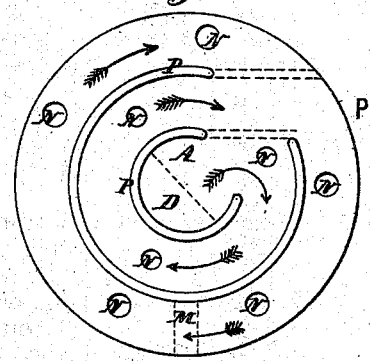
Fig. 2.
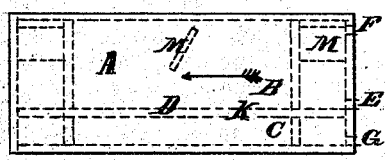
Fig. 3.
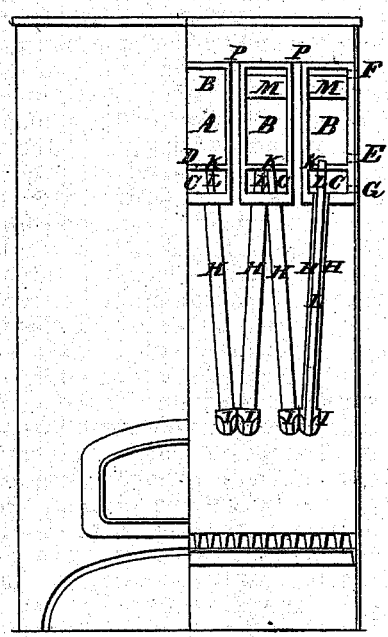
Fig. 7.
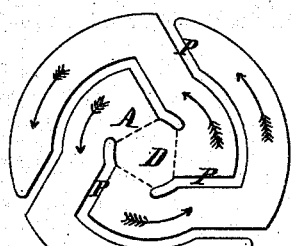
Fig. 8.
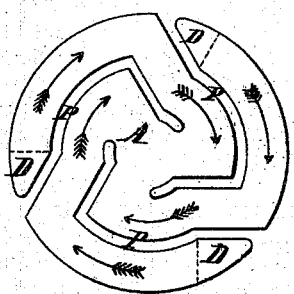
Fig. 9.
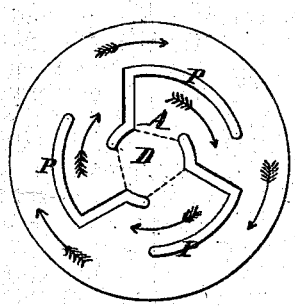
Fig. 4.
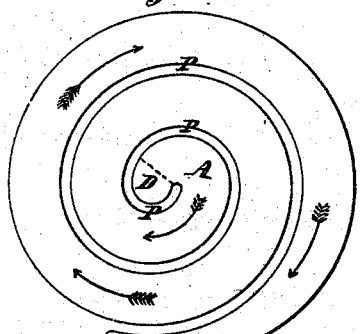
Fig. 5.
Fig. 6.
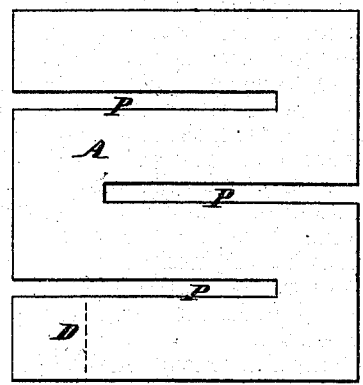
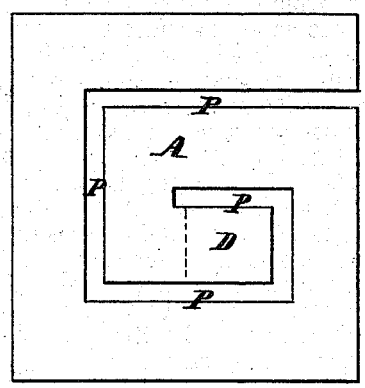
Witnesses.
Addison M. Hahn
John B. Devine.
Inventor.
S. Lloyd Wiegand 119,257

UNITED STATES PATENT OFFICE.

S. LLOYD WIEGAND, OF PHILADELPHIA, PENNSYLVANIA.

IMPROVEMENT IN STEAM-GENERATORS.

Specification forming part of Letters Patent No. 119,257, dated September 26, 1871; antedated September 6, 1871.

*To all whom it may concern:*

Be it known that I, S. LLOYD WIEGAND, of the city and county of Philadelphia, in the State of Pennsylvania, have invented certain new and useful Improvements in Steam-Generators; and I do hereby declare the following to be a full, clear, and exact description thereof.

The nature of my invention consists in constructing a boiler or steam-generator composed of an upper vessel or tank, in combination with double tubes suspended therefrom so as to secure the same degree of safety from danger of destructive explosion as is now obtained in steam-generators constructed in sections, and at the same time to obtain the necessary fluid capacity, effective heating-surface, and proper proportion of grate-surface for the thorough combustion of fuel required for the satisfactory production and use of steam.

I secure these results in the following manner: I make the upper vessel or tank of comparatively small cross-sectional area, say seventy-five square inches, and divide it into two or more compartments, from the lower of which the tubes which form the heating-surface are suspended into the furnace. Water is supplied thereto through inner tubes or guides from the upper compartments, and the water and steam return to the upper compartment at the end of the vessel or tank furthest removed from the water-feed, in the manner hereinafter shown and described. I make this vessel or tank of sufficient length to secure the requisite fluid capacity, and arrange it in folds or coils of such shape, usually in a circular or involute form, or in a rectangular form, as to be conveniently applicable to a furnace. The interstices of the folds or coils furnish the flues through which the products of combustion pass to the chimney. I thus secure a uniform draught over the whole of the grate-surface and an equal distribution of heat to the tubes. A boiler or steam-generator constructed in this manner posseses not only all the advantages as to safety in use, economy in fuel and space, durability and freedom from scaling, claimed for my double-tube sectional steam-generator, for which Letters Patent have heretofore been granted and the merits of which are now readily recognized by the public, but it dispenses with the numerous joints required in that generator to unite the several sections. It does not require to be set in brick-work, and is compact, light, and portable. These features render this form of generator specially advantageous for the steam-heating of buildings, and for that class of industrial pursuits where comparatively small power is required.

I will now proceed to describe particularly and fully the mode of making and using my invention, referring to the accompanying drawing and letters of reference marked thereon.

The same letters apply to the same parts in the several figures.

Figure 1 shows a plan of a boiler. Fig. 2 shows a side elevation without the tubes or furnace. Fig. 3 shows a vertical half-section with the furnace. Fig. 4 is a plan of a boiler constructed with the upper vessel or tank in a spiral or involute form. Figs. 5, 6, 7, 8, and 9, show, in plan view, modifications in the form of the tank and the flue used in conjunction with it.

A represents the tank, composed of two chambers or compartments, B and C, divided by the partition K and communicating with each other, as shown at D, in Figs. 1, 2, and 3. At the other end of the chamber water is supplied through an aperture, E, and the residuum or impurities of the water are emptied either by the opening G or by the opening E, or by both, by the operation known to engineers as "blowing off," or, in other words, expelling the water by the elastic force of the steam. Steam is delivered through the aperture F. The tank A may be most easily produced by casting, and may have apertures N (closed when in use by suitable plugs or other known means) either in the ends, or on the top, or both, for the purpose of supporting the core in casting, and subsequently removing it. Into the bottom of the tank A are inserted tubes H, closed at the lower ends by the caps I, or by their own material being closed together. Inside each of the tubes H is another tube or guide, L, which through suitable perforations in the partition-plate K, receives a supply of water from the lower parts of the chamber or compartment B, and conducts it to the bottom of the tube H, whence it rises through channels in the cap I into the annular space between the tube H and the guide L into the lower compartment C, and thence through the opening D into the upper compartment B. When heat is applied to the tubes H, the water in the annular spaces within the tubes H and around the guides L becomes specifically lighter than the water in the guides L, and is forced upward by the greater weight of the column of water in the guides L into the chamber C; thence it passes at D into the chamber B, whence it again descends through the guides L. This action continues until steam is generated, when the circulation of the currents just described is greatly accelerated, so very much in fact as to raise the level of the water at the end D of the chamber B considerably higher than at the opposite end. The tubes H contiguous to the flue P (see Fig. 3) I sometimes place with the lower ends inclined toward the flue P, so as to obstruct the flow of the products of combustion from the furnace into the flue P. The tubes H are straight, but are inclined by inserting them obliquely into the tank A. The arrows indicate the direction of current in the upper chamber B. Across the chamber B I place oblique deflecting pieces M, having a space above them for the passage of steam horizontally toward the steam-outlet, and which deflect the water when boiling rapidly, so that but very little of the water contained in the boiler in the form of foam, at D, is carried off mechanically with the steam at the outlet F. These deflectors M are made so as to always have their lower edges immersed in water, and are set with their upper edges inclined against the current flowing toward the steam-outlet. In Fig. 4 the tank A is formed as an involute or spiral in horizontal plane, thus making a boiler adapted for use in portable cylindric furnaces. The flue P, it will be seen in Fig. 4, winds in an involute form between the coils of the tank A, affording an equal draught to all parts of the furnace.

Other forms of tank may be made embodying the same principles of construction and operation as I have described. Six plans are shown. Fig. 5 shows one of a zigzag form with flues P between the folds of the tank A. Fig. 1 exhibits one formed of concentric rings with the flue P between them. In Fig. 6 a tank is shown formed in labyrinth-like folds with a flue P of similar shape between them. In Figs. 7, 8, and 9 are shown plans of a tank formed with several branches coiled with intervening flues around the central portion in Fig. 7; the point D of communication between the upper and lower chambers is in the center; in Fig. 8 there is a communication between the upper and lower chambers, the outer end of each of the coils as marked D; and in Fig. 9 the coils are united at the outer extremities forming a ring, and also at the inner extremities where the communication between the upper and lower chambers is made as marked D. In all of these the functions performed and the devices employed to accomplish them are substantially the same, viz., in a vessel of such small cross-section as to be safe from danger of destructive explosion an upper chamber of sufficient length is provided in which the steam and water admitted in a foaming condition from the tubes become separated before the steam reaches the outlet F, and a reliable supply of water is insured to the descending columns in the tubes through the guides L, the whole being of such form and construction as to be conveniently applicable to portable furnaces. Locating the feed and "blow-off" apertures as I have described and shown, enables me easily to wash out any foreign matter deposited by the water in either compartment of the tank. I am aware that boilers having curved tubes containing guides have been proposed for the purpose of intercepting the products of combustion passing into the chimney or flue, but such curved tubes being difficult to screw in and unscrew, are undesirable. This I distinctly disclaim.

What I do claim as my invention, and desire to secure by Letters Patent, is—

1. A boiler or steam-generator, composed of a single vessel or tank of any length, (having a small cross-sectional area,) and arranged or disposed in folds or coils, in combination with suspended tubes, substantially as shown and described.

2. The tank or vessel, formed in folds or coils with an intervening flue or flues, in combination with the suspended tubes, substantially as shown and described.

3. The oblique deflectors M, as shown and described.

4. The parallel straight tubes arranged in rows, in combination with and inclined toward the narrow and long flues intercepting the products of combustion passing through the flue to the chimney.

S. LLOYD WIEGAND.

Witnesses:
ADDISON MAY HAHN,
JOHN B. DEVINE.                    (72)